June 29, 1926.
F. R. SUNDERMAN
1,590,707
APPARATUS FOR MOLDING TUBULAR INSULATORS
Filed Sept. 20, 1922     3 Sheets-Sheet 1
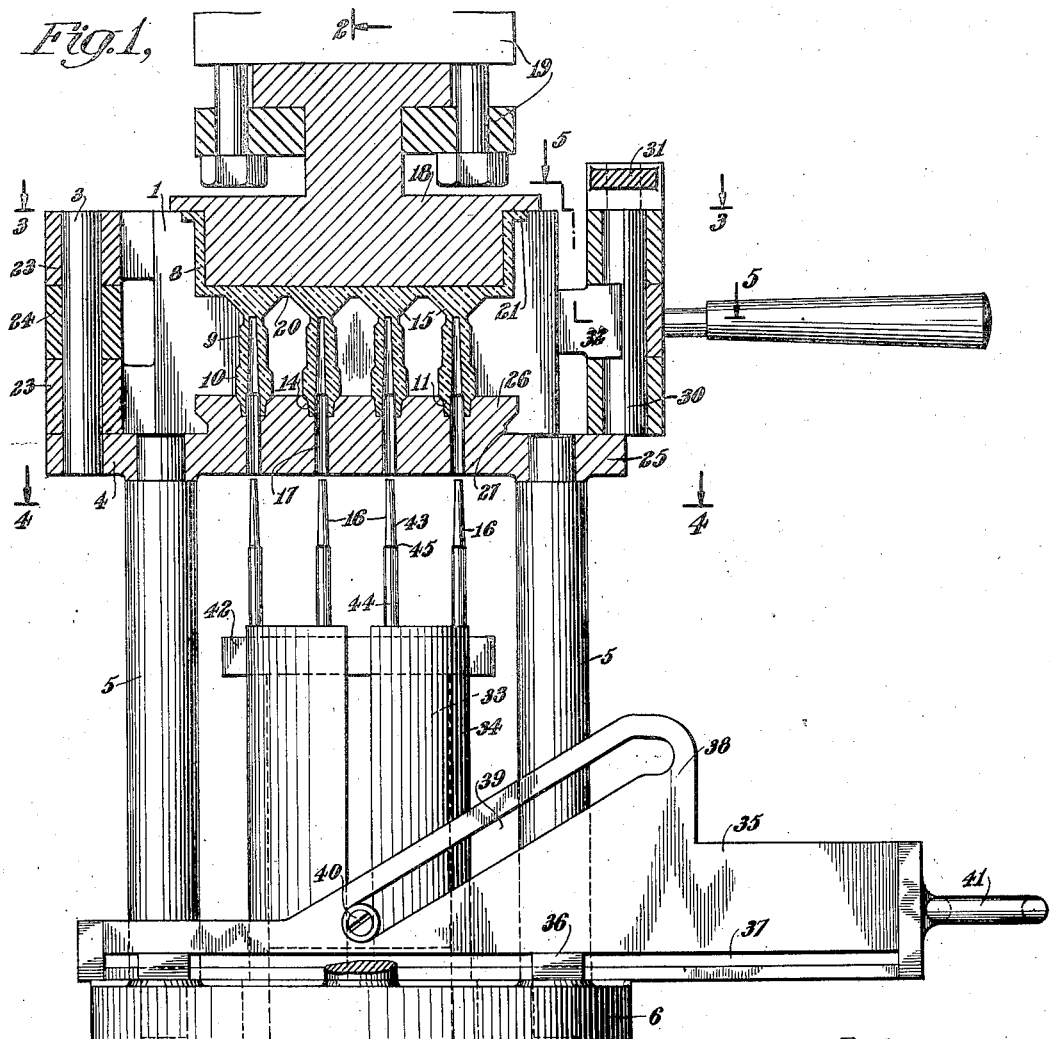
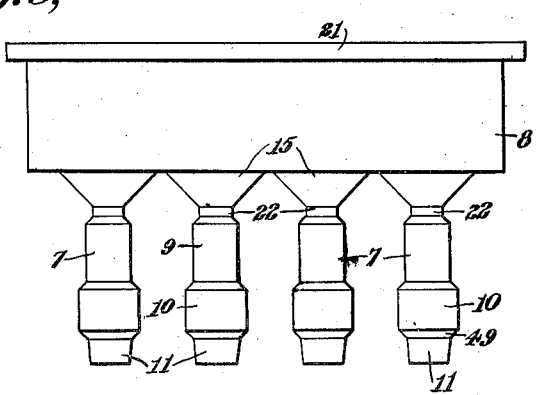
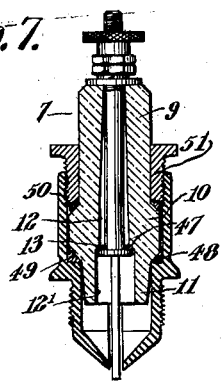
Inventor
Frederick R. Sunderman
By his Attorneys
Ward, Crosby and Smith June 29, 1926.
F. R. SUNDERMAN
APPARATUS FOR MOLDING TUBULAR INSULATORS
Filed Sept. 20, 1922  3 Sheets-Sheet 2
1,590,707
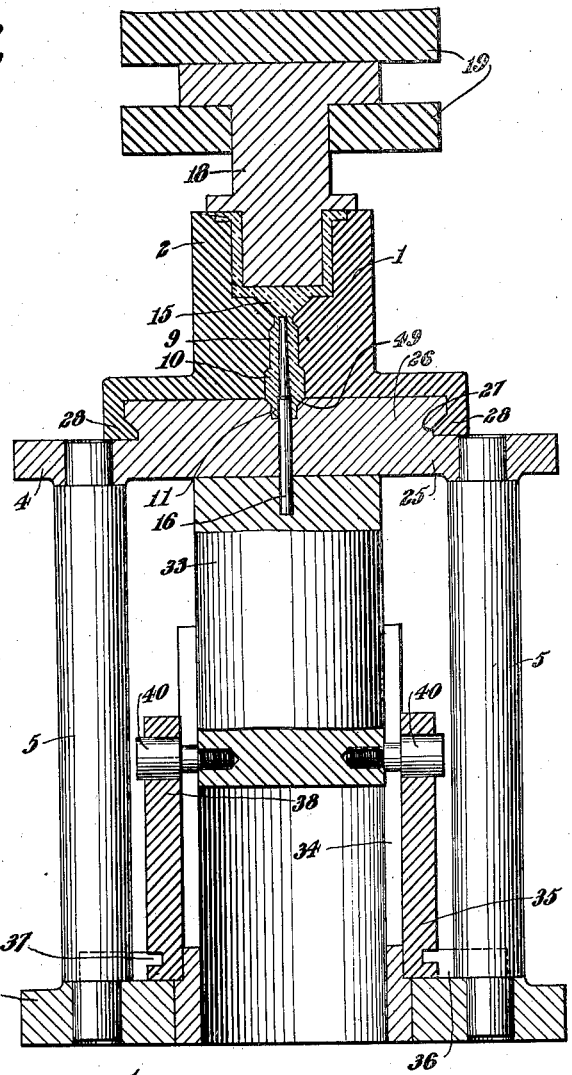
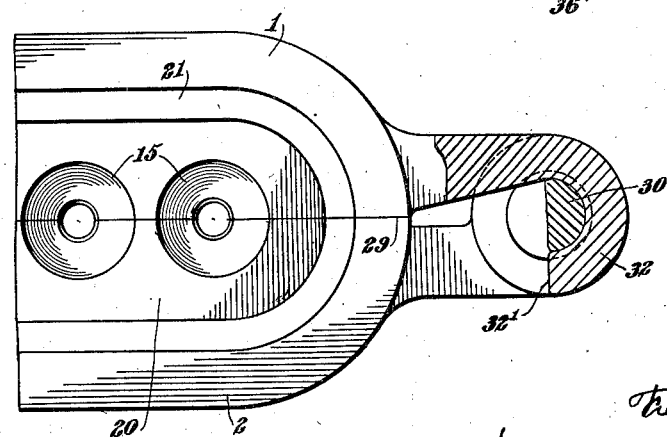

June 29, 1926.  1,590,707
F. R. SUNDERMAN
APPARATUS FOR MOLDING TUBULAR INSULATORS
Filed Sept. 20, 1922   3 Sheets-Sheet 3
Fig.3,
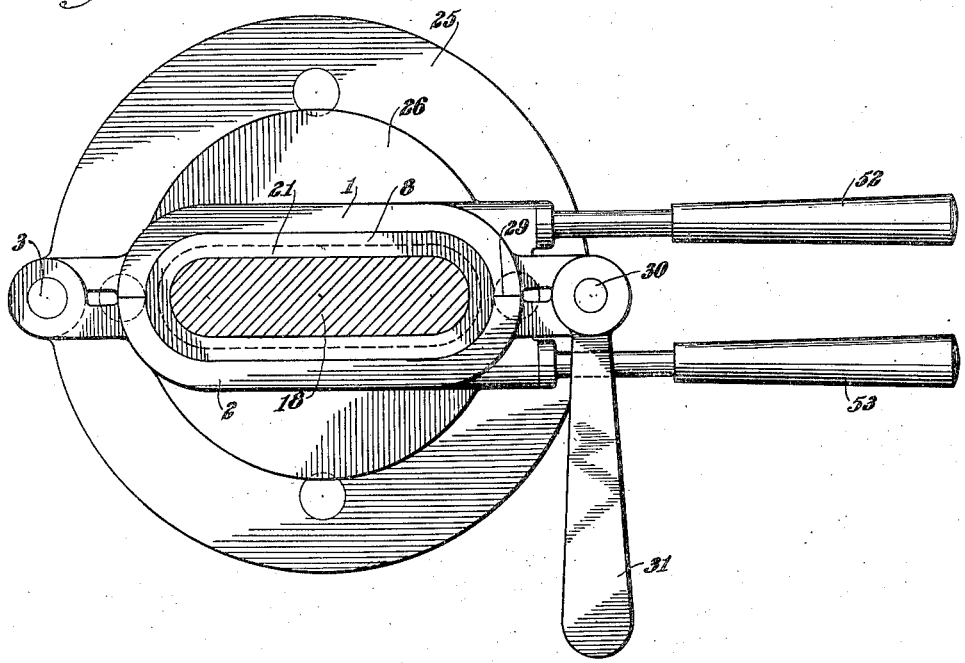
Fig.4,
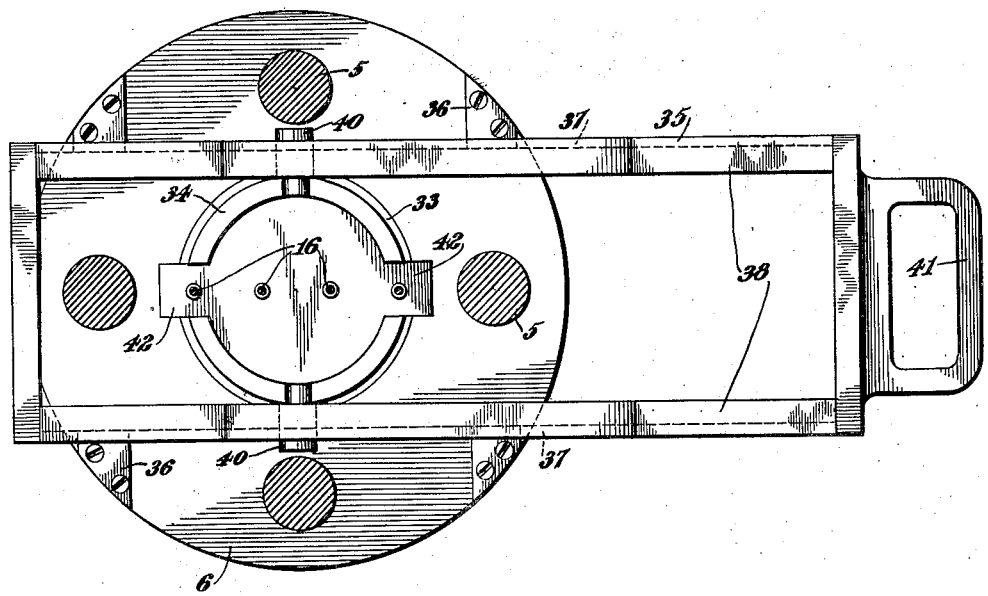

Patented June 29, 1926.

1,590,707

UNITED STATES PATENT OFFICE.

FREDERICK R. SUNDERMAN, OF NEWBURGH, NEW YORK, ASSIGNOR, BY MESNE ASSIGNMENTS, TO JAMES D. LACEY, OF NEW YORK, N. Y.

APPARATUS FOR MOLDING TUBULAR INSULATORS.

Application filed September 20, 1922. Serial No. 589,300.

The invention relates to tubular insulators and process of and apparatus for producing the same. It relates particularly to a tubular glass insulator as an article of manufacture for us particularly as a spark plug insulator. It also relates particularly to improved processes by which such insulators may be produced from glass effectively, simply, and economically, and to improved forms of apparatus by which such processes may be carried out.

The problem of effectively molding glass into the form of tubular bodies of the character contemplated herein has been an extremely difficult one. To produce such a tubular insulator by a molding process it is necessary that the same be formed about a core and that the core be withdrawn after the formation of the article without sticking thereto and without injuring the same during the formation of the article or the withdrawal of the core. The insulators produced, because of the use to which they are put, must be substantially flawless. One of the objects of the invention is the production of such articles in such a manner and by such means as to overcome the difficulties, which are inherent in the molding of glass for the production of articles of the character referred to. Other objects of the invention relate to the production of improved processes and steps thereof, combinations of parts and forms of construction of the apparatus and of the article referred to, all as will be more fully set forth in the following specification.

In order that a clearer understanding of the invention may be had attention is hereby directed to the accompanying drawings forming part of this application, and embodying, by way of example, one form of apparatus by which the improved article may be made and the improved process carried out. In the drawings—

Fig. 1 represents a vertical section through a molding apparatus embodying the invention, the apparatus being shown at the moment when a plurality of insulators have been formed therein and the cores withdrawn from the insulators;

Fig. 2 is a vertical section taken on line 2—2 of Fig. 1, the cores being shown in raised position;

Figs. 3, 4 and 5 are respectively horizontal sections taken on lines 3—3, 4—4 and 5—5 of Fig. 1;

Fig. 6 is a side elevation of a plurality of insulators produced in the apparatus prior to the separation of each of the same from a hollow glass body molded therewith, and Fig. 7 is a sectional view of one of the finished insulators shown mounted in position within a spark plug.

Referring to the drawings, I have illustrated a two part mold, the two parts of which, 1 and 2, are both pivotally mounted on a vertical pivot pin 3. The latter may be supported on a plate 4 over which the two mold sections swing in opening and closing the same, plate 4 being supported by standards 5 from a base member 6.

The molded insulators 7, 7, together with the glass well 8, with which a plurality of insulators are molded, are shown in Fig. 6 of the drawings. Each of the insulators is shown as provided with an upper cylindrical portion 9, a portion of enlarged diameter 10 below the same and a portion 11 of comparatively short length and preferably somewhat tapered inwardly and downwardly, below the portion 10 of enlarged diameter. Each of these insulators is formed with an axial opening 12 extending through the same, this opening being shown as having an enlarged diameter $12^1$ for a portion of the lower end thereof so as to provide an annular internal seat 13 (Fig. 7) which is shown as located adjacent the upper end of the bottom portion 11 of the insulator.

The plate 4 is provided with a plurality of die openings 14 in its upper surface in which the lower portions 11 of the insulators are formed. The upper portions of the insulators 9 and 10 together with the glass well 8 connected therewith are formed jointly by the mold sections 1 and 2, each of which is provided with mold cavities for forming one-half of the well 8 and one-half of the portions 9 and 10 of the insulators together with one-half of the conical runners 15 by which the bottom surface of well 8 is connected with the upper ends of the insulators.

The insulators are formed about cores 16 which are extended upwardly through aligned openings 17 in plate 4. When the insulators are to be cast the mold sections 1 and 2 are closed together and the cores 16 are raised into position to extend through openings 17 in plate 4 and through the mold cavities by which portions 9 and 10 of the insulators are to be formed and part way into the mold cavities by which the runners 15 are to be formed. The mold cavity formed of mold sections 1 and 2 being open at the top a suitable quantity of molten glass is placed therein, whereupon the plunger 18 may be operated by a suitable press head indicated at 19, with which it is connected in any suitable manner.

The plunger 18 enters the upper end of the cavity and forces the molten glass into the mold cavities surrounding cores 16 in mold sections 1 and 2 and in the upper face of plate 4. Surplus glass will form the runners 15 and the bottom 20 of well 8, and will rise about the sides of the plunger to form the vertical walls of the well 8. Preferably the mold cavities in sections 1 and 2 are so formed as to provide the well 8 with an upper outwardly extending flange 21.

Immediately upon the completion of the downward movement of plunger 18 the cores 16 are withdrawn downwardly out of the molded articles and below plate 4 into the position shown in Fig. 1, after which mold sections 1 and 2 may be opened, the complete molded article, as shown in Fig. 6, removed, the mold sections again closed and the operation repeated. The insulators as molded may be provided with neck sections 22 of reduced diameter between portions 9 of the insulators and runners 15. The finished insulators will be cut away from well 8 about these reduced necks 22.

Various features of construction of the apparatus described generally above will now be described with greater particularity. Mold sections 1 and 2, as stated, are both pivoted on the vertical pin 3, mold section 1 being shown as having upper and lower end portions 23, 23, journalled on the pin 3, while mold section 2 is provided with a single end portion 24 which is journalled on pin 3 between the upper and lower portions 23 of member 1. Table 4 is formed as a disc 25 having a portion 26 of circular periphery extending upwardly therefrom for a comparatively small distance, portion 26 being of a diameter considerably less than that of the main disc 25. The mold openings 14 in which the lower end portions of the insulators are formed are provided in the upper face of the disc portion 26. When mold sections 1 and 2 are opened or closed they will move over the upper surface of the outer and lower disc portion 25 of table 4, the mold sections, when closed, surrounding the upper and inner disc portion 26 of table 4. Portion 26 of the table as shown is provided with a lower portion 27 of reduced diameter in comparison with that of the upper part of portion 26. Mold members 1 and 2 are so shaped as to fit closely about the periphery of disc portion 26 of the table when they are closed, the mold sections having inwardly extending curved flanges 28, 28, which are adapted to extend into the groove, or portion of reduced diameter, 27, of the disc portion 26 of table 4, when the mold sections are closed. The disc portion 26 of the table will accordingly act as a guide and registering means for properly aligning the mold sections when they are closed. With this construction the mold sections need not be permanently secured to table 4, pin 3 being unattached to table 4, if desired.

When the two mold sections have been swung into closed position with their adjacent outer edges abutting along the line 29 (see Figs. 3 and 5), the mold sections may be locked in closed position by any suitable means, such as an eccentric stud, or the like, as is well known. As shown in the drawings mold section 2 may be provided with a vertical half-round pin or stud 30 having a handle 31 secured to the upper end thereof. Stud 30 is mounted for rotation in suitable bearings in section 2 and may be caused to clear the edge $32^1$ of lug 32 on mold section 1, when the molds are being closed together, and then rotated by handle 31, through 180 degrees, into position to extend into locking engagement within lug 32, as shown in Fig. 5.

The cores 16 are formed of a material which will not deteriorate under comparatively high heat. Preferably they are formed of vanadium steel which radiates heat rapidly and may be heated to approximately 3900° F. without scaling.

Preferably the cores 16 are carried by and extend upwardly from a vertical cylinder 33 which is mounted for vertical reciprocation within a vertical cylindrical guide member 34 which extends upwardly from base member 6. The cylinder 33 is adapted to be raised and lowered by suitable means. In the form of device illustrated a member 35 is mounted for horizontal sliding movement on base member 6, member 35 preferably being guided in its forward and back movement by means of lugs 36 on base member 6 which co-operate with under-cut guide ways 37 on the sides of member 35. Member 35 is shown as provided with outer side wall portions 38, each of which has an inclined slot 39 extending therethrough.

Cylinder 33 is provided with a pair of rollers 40 extending outwardly from opposite points thereon and into the slots 39. Accordingly when member 35 is pushed inwardly from the position shown in Fig. 1 of the drawings, member 33 will be raised as rollers 40 ride up the inclined slots 39, into the position shown in Fig. 2, and member 33 with the cores 16 will be lowered into the position shown in Fig. 1 when member 35 is again drawn outwardly. Member 35 may suitably be operated by hand by means of the handle 41 provided at the other end thereof. To aid in guiding cylinder 33 in its upward movement until cores 16 have entered openings 17 of table 4, it may, if desired, be provided with a pair of opposite lugs 42, at points intermediate the rollers 40, which lugs are adapted to reciprocate through suitable vertical guiding slots in the upper part of cylinder guide member 34.

The cylinder 33 carrying cores 16 may be formed of cast iron or other suitable material and is preferably relatively large in comparison with cores 16 carried thereby. Cylinder 33 accordingly has a considerable mass and a considerable exterior surface in comparison with the cores 16 carried thereby. Accordingly the cooling of cores 16 to a desired extent, after the cores have performed their function and have been withdrawn below plate 4, will be facilitated by this construction. This is for the reason that cylinder 33, subjected to the outside air and somewhat protected by table 4 from the heat of the molds, is relatively cool at all times in comparison with the cores 16 which are from time to time subjected to the heat of the molten glass within the molds, and therefore the heat in cores 16 will be conducted rather rapidly into the cylinder 33 and dissipated from the outer surface of the latter to a considerable extent by radiation.

I have found that the proper working of the process depends to a considerable extent upon the proper maintaining of the temperature of the cores 16. If the latter are permitted to become too hot, they will scale, and spoil the insulators cast thereabout. On the other hand, if the cores are chilled too greatly between their withdrawals from and entrances into the molds, they will cause the formation of chill spots in the glass insulators formed about the same. Accordingly it is highly desirable to prevent the cores from becoming heated at any time to a point at which they begin to scale, while at the same time they should not be chilled too much below this point. As stated, the cores should be withdrawn from the molds immediately after the insulators have been formed about the cores and by operating in the manner described the cores may readily be withdrawn from the articles without sticking thereto and without injuring the same in any way.

It will be noted that the articles formed have their lower end portions 11 molded seamlessly within the die openings 14 of plate 4 while the upper portions of the insulators are formed with a longitudinal seam therein along the parting line between mold sections 1 and 2. I consider it highly desirable to form the portions 11 of the insulators without seam, and with the certainty that these portions of the insulators will be formed truly to exact size because of the use to which the insulators are to be put. Portions 11 of the insulators will necessarily be all molded exactly the same because of the fact that each of them is formed in an identical mold cavity. When a member or portion of a member is formed jointly by two or more mold sections there is, of course, always the necessity of accurately aligning the several mold sections in order to insure accuracy of the part molded therein but such considerations are avoided in connection with the formation of the lower portions 11 of the insulators.

The lower end portions 11 of the insulators are designed to be the lower or inner portions of the same when mounted in a spark plug and inserted in position for use in the combustion chamber of an engine. It is accordingly important that the same should be so formed that there will be no leakage of pressure past the same.

The cores 16 are preferably provided with upper portions 43 which may be formed with a slight taper, the lower or larger diameter of portion 43 being somewhat less than the diameter of the lower, cylindrical portion 44 of each core. A slight peripheral shoulder 45 is accordingly provided between the portions 43 and 44 of each core. The internal shoulder 13 within each insulator will be formed by the shoulder 45 of the corresponding core.

When an insulator is mounted in position in a spark plug, as indicated in Fig. 7, an electrode 46 will be extended through the central opening 12 of the insulator, this electrode having a peripheral shoulder 47 adapted to bear against the seat 13 within the insulator. A gasket 48 is positioned against the surface 49 of the insulator which connects the shoulder 10 with the lower portion 11 of the insulator. A metal jacket 50 is commonly positioned about the insulator, this having a shoulder which will bear against the gasket 48, a threaded member 51 surrounding the portion 9 of the insulator and being screwed into the upper portion of member 50 to draw the same up tightly against gasket 48.

It will be noted that not only the portion 11 but also the gasket seating surface 49 of the insulator is formed within the die opening 14 of plate 4, so that surface 49 is formed seamlessly. This is of importance since surface 49 will accordingly be a smooth true surface against which the gasket will fit tightly to prevent loss of pressure from the engine cylinder about the same. If surface 49 were formed with a slight seam therein, this might tend to tear the surface of the gasket to some extent when the parts are screwed into position as described, which might result in an imperfect joint at this point.

The manner in which my improved process is carried out will, it is believed, be clear from the foregoing description. In operation the mold sections 1 and 2 are closed together, by means of the handles 52 and 53 thereof, the mold sections locked in position by handle 31 and cores 16 moved upwardly to extend into the mold cavities by which the runners 15 of the insulators are to be formed. Molten glass being placed in the mold the plunger 18 will then be depressed to force the molten glass into and throughout the molt cavities, as described. The glass will set instantaneously about the metallic cores and the latter will then be instantaneously dropped into the position shown in Fig. 1, plunger 18 raised and the mold sections 1 and 2 opened. The completed insulators, four in number, in the embodiment shown in the drawings, attached to the glass well 8, will then be removed from the mold, the upper flange 21 of the well 8 serving as a convenient means for lifting the molded article from the mold. The insulators may then be cut or broken about necks 22 away from the glass well 8 and the latter together with the runners 15 integral therewith remelted.

Any bubbles or dross in the molten material will rise into the upper part of the mold and will accordingly be present in the well 8, and not in the insulators themselves.

It will be noted that my improved process, in one aspect of the same, consists in positioning a mold vertically, inserting a core therein from the bottom, forcing molten glass into the mold from above and immediately withdrawing the core. In another aspect of my improved process the same comprises maintaining the core at such a temperature that it will neither scale or produce chill spots within the insulator formed thereabout. By forcing the molten or plastic material into the mold from one end such as the upper end and operating the cores from the other or lower end in the manner described, it is possible to so regulate the conditions as to result in the formation of perfect articles of the character referred to. In another aspect of my invention the same consists in the process in which the metal cores are carried by a relatively massive body of metal having a considerable heat radiating surface so that the heat will be drawn from the cores into this mass of metal to a desired extent and radiated therefrom after each operation, as has been described.

It should be understood that the invention is not limited strictly to the exact details of construction and steps of process which have been particularly described, but that the same is as broad as is indicated by the accompanying claims.

What I claim is:

1. In apparatus for molding tubular insulators, the combination of a mold containing cavities adapted jointly, together with cores, to form tubular articles, cores formed of vanadium steel, a metallic member carrying said cores, having large mass and surface relatively to said cores, said member being exposed to the atmosphere, means for moving said member to insert said cores into said cavities from one end and to remove the same, and means for forcing molten or plastic material into the complete cavities through the other end thereof.

2. In apparatus for molding tubular insulators, the combination of a fixed horizontal plate having a plurality of approximately cylindrical cavities therein for the lower end portions of insulators formed in the upper surface thereof, a pair of mold members arranged to move over said plate to open and close, said members jointly containing mold cavities adapted to form the remaining portions of the insulators, aligned with the first mentioned cavities when said members are closed, and a mold cavity for surplus material above said last named cavities, connecting therewith, and open at the top, a plunger adapted to enter said surplus material cavity to fill the same except for a space thereabout, cores for the insulators, a metal cylinder below said plate, carrying said cores, having large mass and surface area relatively to said cores, and means for raising and lowering said cylinder to move said cores axially into and out of the insulator cavities from below the same, said plate having openings therethrough from the passage of said cores.

3. In apparatus for molding tubular insulators, the combination of a mold containing cavities adapted, together with suitable cores, to form tubular articles, and a cavity for surplus material connecting with adjacent ends of all said first named cavities, a plunger adapted to enter said last named cavity and to force plastic or molten material into said mold cavities, cores for said first named cavities, a metallic member carrying said cores, and exposed to the atmosphere, and means for moving the same to insert said cores into and withdraw them from said first named cavities, said metallic member being of large mass and surface area relatively to said cores.

In testimony whereof I have signed my name to this specification.

FREDERICK R. SUNDERMAN.